Figure 3:
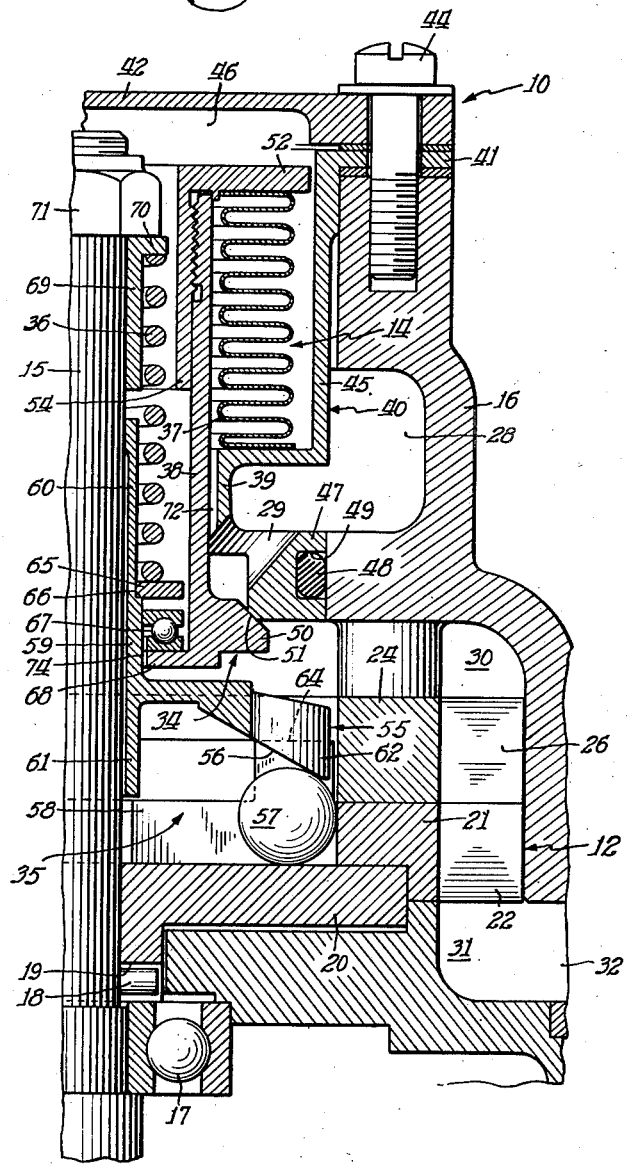

Nov. 5, 1957  H. H. CAMPBELL  2,811,930
AIR MOTOR GOVERNOR
Filed June 18, 1952  2 Sheets-Sheet 1
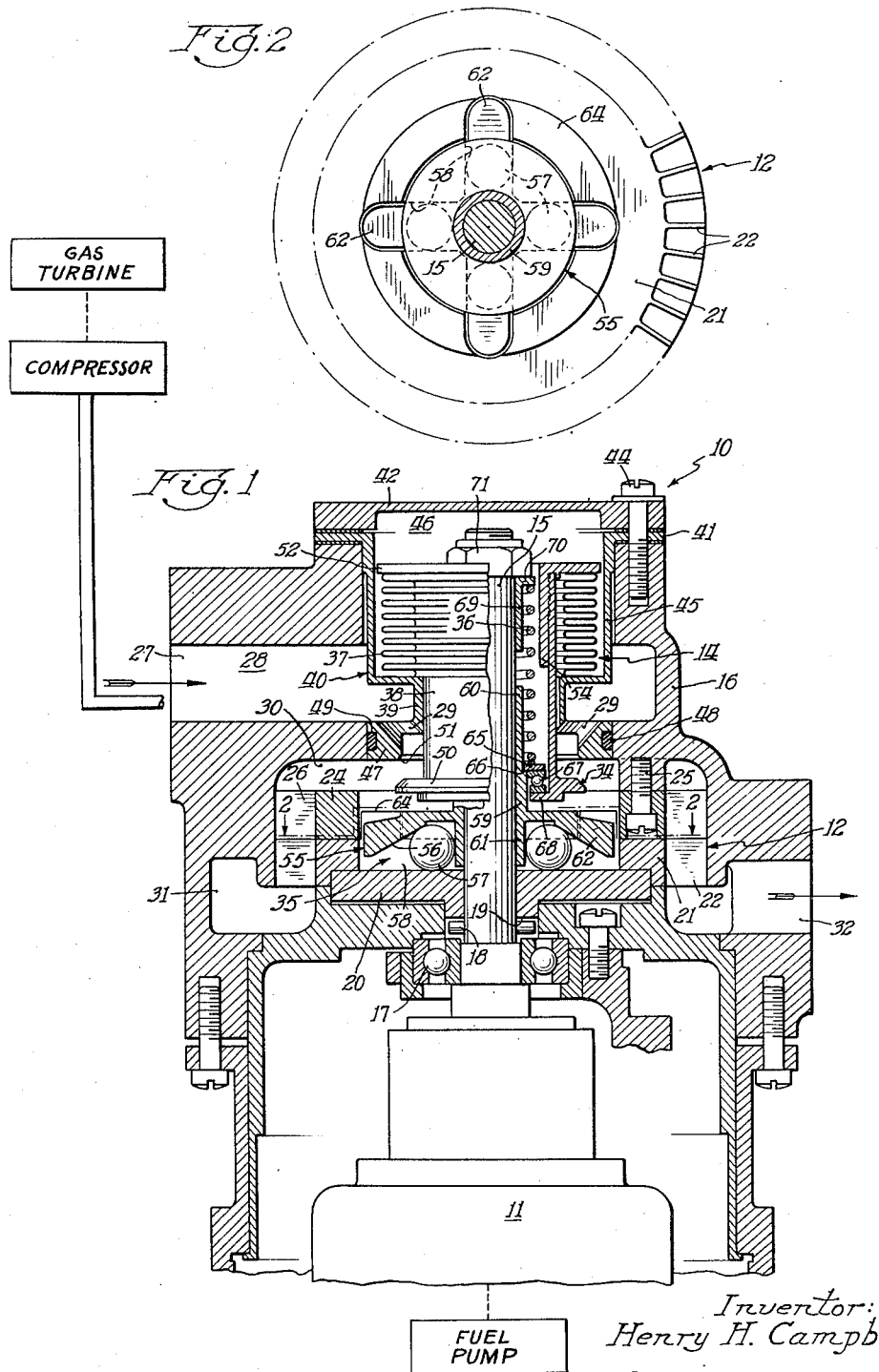
Inventor:
Henry H. Campbell
By Alonzo B. Kight Atty.

Nov. 5, 1957 H. H. CAMPBELL 2,811,930
AIR MOTOR GOVERNOR
Filed June 18, 1952 2 Sheets-Sheet 2

Inventor:
Henry H. Campbell
By: Alonzo B. Kight
Atty.

United States Patent Office 2,811,930
Patented Nov. 5, 1957

2,811,930

AIR MOTOR GOVERNOR

Henry H. Campbell, East Cleveland, Ohio, assignor to Borg-Warner Corporation, Chicago, Ill., a corporation of Illinois Application June 18, 1952, Serial No. 294,282

18 Claims. (Cl. 103—207)

This invention relates to a power supply system for driving a pump or the like, and more particularly, the invention relates to governor means for controlling the speed of rotation of an auxiliary air motor or turbine for driving a pump when the normal driving mechanism is inoperative.

In aircraft engine fuel systems it is common practice to provide an electric motor driven fuel pump. In such installations it is desirable to provide auxiliary means for supplying fuel to the engine in case of failure of the electric motor drive. Heretofore, one practice has been for such emergency fuel supply means normally to incorporate a second or emergency fuel pump driven from another power source. Frequently, such emergency system was not automatic in operation, or elaborate automatic controls were provided adding considerable complication, expense, and weight.

The present invention is intended to provide very much simplified and improved means for providing automatic auxiliary or emergency power for driving the engine fuel pump in case the main fuel pump power mechanism becomes inoperative for any reason. In general, the arrangement of this invention includes an air motor or turbine which is adapted to be driven by compressed air bled from any suitable source, such as a gas turbine engine compressor, whenever the speed of rotation of the main fuel pump falls below a predetermined value. In the particular embodiment, the air turbine provides a drive for the main fuel pump at a lower range of speed than the main power supply mechanism, but the speed is still sufficient to supply the gas turbine engine with the proper amount of fuel under all normal circumstances. The control of air flow to the turbine is accomplished by means of a centrifugally actuated valve which is held closed by centrifugal force acting through flyweights when the fuel pump is being driven by the electric motor, so that there is no engine power loss occasioned by bleeding compressor air during normal operation. The valve is pressure balanced by means of a pressure sensitive bellows which opposes the pressure force on the valve face. Further, the construction is such that practically no additional friction is introduced into the system when the control valve is in closed position. The arrangement is very compact, relatively easy to fabricate, and is of light weight.

It is an object of the present invention to provide an improved auxiliary drive mechanism for a pump or the like.

Another object of the invention is to provide emergency drive mechanism for an aircraft gas turbine engine fuel pump including a normally inoperative air motor or turbine adapted for being driven by compressed air from the engine compressor.

A further object of the invention is to provide improved control means for an emergency fuel pump drive in order to reduce power losses.

An additional object of the invention is to provide an air motor governor embodying a balanced valve for controlling the admission of driving air to an air motor in accordance with the speed of rotation of the motor.

Still another object of the present invention is to provide an air turbine for driving an aircraft gas turbine engine fuel pump or the like under emergency conditions at a speed lower than the normal speed of operation of the pump and including a balanced valve actuated by centrifugal force upon fly-weights.

A still further object of the invention is to provide compact and simplified automatic control means for rendering operative an auxiliary drive for a pump or the like when the speed of operation of the pump falls below a predetermined value.

It is a specific object of this invention to provide an air turbine adapted to be driven by compressed air bled from a gas turbine engine compressor with control means for controlling the admission of driving air to the turbine incorporating a valve balanced by means of an improved bellows arrangement, with the valve being actuated to closed position by means of centrifugal fly-weights when the speed of rotation of the pump is above a predetermined value, and with the fly-weights acting to control the amount of opening of the valve to maintain a predetermined range of speed of the turbine and the pump driven thereby when the main pump power supply mechanism is inoperative.

Other objects, features and advantages of the present invention will be apparent from the following detailed description of one embodiment, by way of preferred example only, taken in conjunction with the accompanying drawings, in which:

Fig. 1 is a fragmentary, sectional view of an engine fuel pump power supply system, particularly illustrating the auxiliary or emergency drive mechanism including the automatic control arrangement therefor, Fig. 2 is a sectional view taken along line 2—2 of Fig. 1 and illustrating the drive connection between the control means and the auxiliary power supply mechanism, and Fig. 3 is an enlarged, fragmentary, sectional view of a portion of the construction shown in Fig. 1 and illustrating the control valve in the closed position.

The fuel pump power supply system of Fig. 1 is generally designated by the reference numeral 10, and includes an electric motor 11 for normally driving a pump, such as a fuel pump for an aircraft gas turbine engine and shown in Fig. 1 schematically attached to motor 11. An auxiliary or emergency power supply means is provided in the form of an air motor or air turbine assembly 12 which is adapted to drive the pump when the motor 11 is inoperative. The turbine 12 is adapted to be driven by means of compressed air bled from the compressor of a gas turbine engine, or other suitable pressure source, with the supply of driving air to the turbine 12 being cut off by governor control mechanism 14 when the electric motor 11 is driving the pump. The gas turbine engine and the compressor are shown drivingly attached to one another schematically in Fig. 1 with the latter being in communication with the turbine 12 as will be apparent from a more detailed explanation hereinafter. However, when the electric motor becomes inoperative and the speed of the pump falls below a predetermined value, the governor control means 14 admits air to the turbine so that the pump is driven within a range somewhat lower than the normal speed range but still fast enough to supply the engine fuel requirements.

The auxiliary drive mechanism is located at the opposite end of the motor 11 from the fuel pump and is adapted to drive the fuel pump when the motor is inoperative through an extended portion 15 of the motor drive shaft. The pump power supply mechanism is housed in a casing or housing 16 and the shaft portion 15 is rotatably supported in the housing by means of an anti-friction bearing 17 which has its inner race secured to the shaft and its outer race secured within a portion of the casing 16.

The turbine assembly 12 is secured for rotation with the shaft portion 15 by means of a pin 18 which extends through the shaft and has its free end portions disposed in a transverse slot 19 of a hub portion 20 of the turbine assembly. A turbine wheel 21 is fixedly secured to the hub 20 so that the shaft 15, the hub 20 and the turbine wheel 21 rotate as a unit within the casing 16. The turbine wheel 21 includes a plurality of radially extending turbine vanes or buckets 22 (Fig. 2) formed about its complete periphery. A stator 24 is fixedly secured within the casing 16 by means of screws 25 and is located immediately adjacent one face of the turbine wheel 21. A slight clearance (not shown), for example 1/64 of an inch, is provided between the turbine wheel 21 and the stator 24 in order to prevent creation of friction therebetween. The stator 24 is provided with a plurality of radially extending stator vanes 26 which are coextensive with the turbine buckets 22 of the turbine wheel 21.

Compressed air from the gas turbine engine compressor is admitted to the casing 16 through a port 27 and passes through a passage 28 and a plurality of ports 29 to a turbine inlet chamber 30. From the chamber 30 the compressed air passes through the stator vanes 26 to the turbine buckets 22 to cause the turbine assembly 12 to rotate and to cause rotation of the shaft portion 15 through the drive pin 18. The exhaust from the turbine is discharged into an annular exhaust chamber 31 from which it is exhausted through an exhaust port 32.

According to the present invention, means are provided in the form of the control mechanism 14 for controlling the admission of compressed air to the turbine wheel 21. The control mechanism 14 comprises generally a control valve 34, a centrifugal force responsive valve actuator assembly 35, a valve spring 36, and a balance bellows 37. The control valve 34 has a generally cylindrical annular body portion 38 which is slidably supported in a neck portion 39 of a valve cage 40. The valve cage 40 is fixedly secured within the casing 16 by means of an annular flange 41 which is clamped between the upper end of the casing 16 and a closure cap 42 by means of screws 44. The annular flange 41 is formed about the upper peripheral edge of an enlarged bellows chamber portion 45 of the valve cage 40, which portion cooperates with the closure cap 42 to provide a bellows chamber 46 within which the balance bellows 37 is disposed. At the lower end of the valve cage 40, below the neck 39, is formed an annular valve seat portion 47 through which the ports 29 are formed. An annular sealing ring 48 is disposed in an annular outer peripheral groove 49 of the seat portion 47 to provide a seal between the radially outward surface of the valve seat portion and the abutting surface of the casing 16. The valve 34 is formed with a mushroom head portion 50 at its lower end which cooperates with a valve seat 51 formed about the radially inward lower edge of the valve seat portion 47 to close off communication between the passage 28 and the turbine inlet chamber 30 when the valve 34 is in its upward, closed position as shown in Fig. 3.

In order to balance the valve 34 against the pressure of the incoming air, the balance bellows 37 is provided. The bellows 37 is of thin, flexible sheet metal, annular fluted construction, so that an excess of pressure within the bellows will cause axial expansion. The bellows is disposed in the bellows chamber 46 about the body portion 38 of the valve 34 and has its lower end secured in sealed relation by brazing or the like to the bottom of the bellows chamber portion 45 of the valve cage 40. The upper end of the bellows 37 is secured in sealed relation in a like manner to an annular flange 52 formed at the upper edge of a sleeve member 54 which is threadedly inserted in the upper end of the body portion 38 of the valve 34. The effective pressure area of the bellows is substantially equal to that of the valve head 50. A light spring load is provided by the bellows to urge the valve 34 toward closed position.

The centrifugal force responsive actuating mechanism 35 includes an actuator member 55 having a downwardly facing frusto-conical surface 56 and a plurality of centrifugal fly-weights or fly balls 57, herein shown as four in number. The fly balls 57 are disposed in respective radially extending grooves 58 formed in the radially inward portion of the turbine wheel 21. The fly balls are retained within the grooves by means of the hub 20 and the actuator member 55 and are in contact with the frusto-conical surface 56 of the actuator member. An axially extending sleeve portion 59 of the actuator 35 is slidably disposed about the shaft portion 15 and has an upwardly extending part 60 and a downwardly extending part 61, with the sleeve part 61 forming a radially inward stop for the fly balls 57. The outward extremities of the grooves 58 form outward stops for the fly balls 57. Four radially outwardly extending lugs 62 are formed on the actuator member 35 and have their lower surfaces forming extensions of the frusto-conical surface 56. The lugs 62 are disposed in the radial slots 58 of the turbine wheel 21 so that rotation of the turbine wheel causes rotation of the actuator member 35, but the actuator is axially shiftable relative to the turbine wheel. The turbine wheel 21 is provided with an annular flange 64 formed at the outer extremities of the grooves 58 and intersected by the grooves, so that axial shifting of the actuator 35 will not disengage the lugs 62 from the grooves 58, in order that the actuator will always rotate with the turbine wheel 21 regardless of its axial position. The fly balls 57 and the surfaces in contact with the fly balls may be hardened in order to prevent excessive wear.

It will be seen that rotation of the turbine assembly 12 will cause the fly balls 57 to move radially outwardly in response to centrifugal force which will cause the actuator 35 to move upwardly due to the engagement of the fly balls with the frusto-conical surface 56. In order to oppose this tendency and to urge the valve 34 toward open position, the valve spring 36 is provided within the body portion 38 and the member 54 about the shaft portion 15. The bottom end of the spring 36 abuts a thrust washer 65 which is bottomed on an annular shoulder 66 formed on the upper sleeve part 60 of the actuator 35. The thrust washer 65 is also adapted to abut the upper race of an anti-friction thrust bearing 67 whch has its lower race disposed against a radially inwardly extending annular flange 68 formed at the lower end of the valve 34, so that the spring 36 also urges the valve 34 downwardly toward open position through the thrust bearing 67 against the inherent spring action of the bellows 37. The upper end portion of the spring 36 is disposed about a sleeve member 69 with the upper end of the spring abutting a radially extending flange 70 formed at the upper end of the sleeve member. The sleeve member 69 is retained against upward movement by means of a nut 71 threadedly inserted over the upper end of the shaft portion 15.

The interior of the bellows 37 communicates with the air pressure upstream of the head portion 50 of the valve 34 by means of a plurality of axially extending grooves 72 (one shown) formed on the inward surface of the neck 39 of the valve cage 40. The bellows chamber 46 is referenced to the pressure downstream of the valve 34 through the sleeve member 54, through the body portion 38 of the valve, between the anti-friction members of the bearing 67, and through an annular space 74 (Fig. 3) provided between the radially inward surface of the valve flange 68 and the opposing surface of the upper sleeve part 60 of the actuator 35. The bellows 37 is constructed so that its effective pressure area is substantially equal to that of the mushroom portion 50 of the valve 34. As a result, the pressure differential across the mushroom head 50 is balanced by the pressure differential across the bellows 37 so that the valve 34 is substantially unaffected by changes in pressure.

In operation, when the electric motor 11 is driving the fuel pump, the centrifugal force on the fly balls 57 is sufficient to cause the same to move completely outwardly to positions against the outward ends of the slots 58, so that the actuator 35 is moved to its full upward position against the bias of the spring 36, as shown in Fig. 3. In this position the movement of the actuator 35 is sufficient to move the thrust washer 65 out of engagement with the upper race of the anti-friction thrust bearing 67. Hence, before the actuator 35 has completed its upward movement, the mushroom head 50 has contacted the valve seat 51 to close the valve 34. Thus, there is no longer any contact between the rotating parts of the construction and the non-rotating parts. Since the valve 34 is balanced against pressure, the valve will not open regardless of the magnitude of the pressure in the passage 28 and is held closed by the light inherent spring bias of the bellows 37.

With the valve 34 in the closed position as seen in Fig. 3, the turbine assembly 12 is inoperative for supplying any driving force to the fuel pump, so that all of the driving force is supplied by the electric motor 11. In addition, no compressed air is being bled through the auxiliary power supply mechanism, so that there is no compressor bleed power loss during normal operation of the jet engine with the fuel pump driving motor 11 operating.

When the motor 11 becomes inoperative for any reason, slowing down of the fuel pump and the shaft portion 15 causes a decrease in the centrifugal force exerted on the fly balls 57 so that the spring 36 becomes effective to urge the fly balls inwardly and also to open the valve 34. Upon opening of the valve 34, pressurized air from the passage 28 passes through the ports 29, into the turbine inlet chamber 30, and through the stator vanes 26 to the turbine buckets 22 to cause torque to be exerted on the shaft 15 through the turbine assembly 12 and the drive pin 18 so that the speed of rotation of the shaft will not normally fall below a predetermined minimum. As long as the pressure in the passage 28 is above a fairly low value, the speed of rotation of the turbine wheel 21 is little affected by changes in air pressure since an increase in the air pressure, which tends to increase the speed of rotation of the turbine wheel 21, causes an increase in the centrifugal force exerted on the fly balls 57 to move the valve actuator 55 upwardly to allow the bellows 37 to move the valve 34 toward closed position and thereby to increase the pressure drop past the valve. Therefore, the pressure differential across the turbine, and consequently the turbine speed, increases very little with increase in air pressure, so that the speed of the turbine is maintained within a fairly narrow range even though the supply air pressure may vary over a very wide range.

It will be seen that the auxiliary power supply mechanism is arranged to drive the fuel pump within a lower range of speed than that at which it is driven by the motor 11, but this lower range of speed is sufficient to supply all of the normal fuel requirements of the gas turbine engine. In a typical installation the rated speed of the electric motor is approximately 6300 R. P. M., the control valve 34 is fully closed above 5600 R. P. M., and is fully opened at or below 5300 R. P. M., so that the operating range of the turbine is between 5300 R. P. M. and 5600 R. P. M.

Within the operating rage of the turbine, the speed of rotation varies very little with changes in pressure. However, when the pressure in the supply passage 28 falls below a predetermined minimum value, the valve 34 will be fully opened so that any further decreases in pressure will be evidenced by a proportional decrease in the speed of rotation of the turbine wheel 21, so that below the operating range of the turbine the speed varies substantially with changes in the pressure of the incoming air. During such operation the fly balls 57 will be in the fully inward positions as shown in Fig. 1 so that the valve 34 is fully opened by means of the valve spring 36.

From the above description it will be readily understood that the present invention provides an improved and simplified auxiliary or emergency drive mechanism for the fuel pump of a gas turbine engine. The auxiliary mechanism is fully automatic in operation, light in weight, and simple in construction. When the pump is being driven by the normal drive means, the auxiliary mechanism is inoperative and causes practically no power loss.

It should be noted that when words of relative location, such as "upper," "lower," "left-hand," "right-hand," etc., are used in the description, they are intended merely to facilitate understanding of the structure and are not to be construed as limitations.

It will be understood that modifications and variations may be effected without departing from the scope of the novel concepts of the present invention.

I claim:

1. In a power supply system including a fluid motor for driving power utilization mechanism and means communicating with said fluid motor for supplying fluid under pressure for driving said fluid motor, governor means operatively interposed between said last-mentioned means and said motor for controlling the speed of rotation of said fluid motor comprising flow control mechanism for controlling the flow of fluid to said fluid motor, and centrifugal force responsive biasing mechanism operatively connected to said fluid motor for urging said flow control mechanism in a flow restricting direction in response to increases in motor speed and for urging said flow control mechanism in a flow increasing direction in response to decreases in motor speed, said centrifugal force responsive biasing mechanism having rotatable parts and non-rotatable parts further including a thrust release to operatively disconnect the rotatable parts from the non-rotatable parts when said flow control mechanism is in a position of maximum flow restriction.

2. In mechanism for driving an accessory for a gas turbine having an engine air compressor and including an air motor driven by air from said compressor for driving the accessory, governor means operatively interposed between said air motor and said compressor for controlling the speed of rotation of said air motor comprising flow control mechanism for controlling the flow of air from said compressor to said air motor, and centrifugal force responsive biasing mechanism operatively connected to said air motor for urging said flow control mechanism in a flow restricting direction in response to increases in motor speed and for urging said flow control mechanism in a flow increasing direction in response to decreases in motor speed, said centrifugal force responsive biasing mechanism having rotatable parts and non-rotatable parts further including a thrust release to operatively disconnect the rotating parts from the non-rotatable parts when said flow control mechanism is in a position of maximum flow restriction.

3. In a power supply system including a fluid motor for driving power utilization mechanism and means communicating with said fluid motor for supplying fluid under pressure for driving said fluid motor, governor means operatively interposed between said last-mentioned means and said fluid motor for controlling the speed of rotation of said motor comprising flow control mechanism for controlling the flow of fluid to said motor, a balance bellows operatively connected to said flow control mechanism, means for applying the pressure differential across said flow control to said bellows for counteracting the pressure force exerted on the flow control mechanism to render the operation thereof substantially independent of changes in fluid pressure, and centrifugal force responsive biasing mechanism operatively connected to said fluid motor for urging said flow control mechanism in a flow restricting direction in response to increases in motor speed and for urging said flow control mechanism in a flow increasing direction in response to decreases in motor speed, said centrifugal force responsive biasing mechanism having rotatable parts and non-rotatable parts further including a thrust release to operatively disconnect the rotating parts from the non-rotating parts when said flow control mechanism is in a position of maximum flow restriction.

4. In a power supply system including a fluid motor for driving power utilization mechanism and means communicating with said fluid motor for supplying fluid under pressure for driving said fluid motor, governor means operatively interposed between said last-mentioned means and said fluid motor for controlling the speed of rotation of said fluid motor comprising a valve for controlling the flow of fluid to said fluid motor, a balance bellows operatively connected to said valve and having an effective pressure area substantially equal to that of the valve, means communicating the respective pressures upstream and downstream of said valve to the opposite sides of said bellows whereby the bellows counteracts the pressure force on said valve to render the operation of the valve substantially independent of changes in fluid pressure, and centrifugal force responsive biasing mechanism operatively connected to said motor for urging said valve toward closed position in response to increases in motor speed and for urging said valve toward open position in response to decreases in motor speed, said centrifugal force responsive biasing mechanism having rotating parts and non-rotating parts further including a thrust release to operably disconnect the rotating parts from the non-rotating parts when the valve is closed.

5. In a power supply system including a fluid motor for driving power utilization mechanism and means communicating with said fluid motor for supplying fluid under pressure for driving said fluid motor, governor means operatively interposed between said last-mentioned means and said fluid motor for controlling the speed of rotation of said motor comprising flow control mechanism for controlling the flow of fluid to said motor, spring means operatively connected to said flow control mechanism for urging the flow control mechanism in a flow increasing direction, valve actuator mechanism including centrifugal force responsive fly weights for opposing the force exerted by said spring means, and means for urging said flow control mechanism in a flow restricting direction when the force exerted by said spring means is counteracted by said valve actuator mechanism, whereby said flow control mechanism is urged in a flow restricting direction in response to increases in motor speed and in a flow increasing direction in response to decreases in motor speed, said flow control mechanism further including means for disconnecting said spring means from said valve when said valve is seated.

6. In mechanism for driving an accessory for a gas turbine having an engine air compressor and including an air motor driven by air from said compressor for driving the accessory, governor means operatively interposed between said compressor and said motor for controlling the speed of rotation of said fluid motor comprising a control valve for controlling the flow of air from said compressor to said fluid motor, a balance bellows operatively connected to said valve and having an effective pressure area substantially equal to that of the valve, means communicating the respective pressures upstream and downstream of said valve against the opposite surfaces of said bellows to counteract the pressure force on said valve to render the operation of the valve substantially independent of changes in air pressure, spring means urging said valve toward open position, and valve actuator mechanism including centrifugal force responsive fly weights operatively connected to said motor for opposing the force exerted by said spring means, said bellows having an inherent spring action for urging said valve toward closed position when the force exerted by said spring means is counteracted, whereby said control valve is moved toward closed position in response to increases in motor speed and toward open position in response to decreases in motor speed, said valve actuator mechanism further including means operatively disconnecting said spring from said valve when said valve is in closed position.

7. In a fuel supply system for a gas turbine having an engine air compressor, a fuel pump for supplying fuel to said gas turbine, and power mechanism for normally driving said pump; auxiliary means for driving the pump when the power mechanism is inoperative and comprising an air motor for driving the pump, means communicating with said air motor for supplying a portion of the compressed air from said compressor to said air motor for driving the same, and governor means operatively interposed between said last-mentioned means and said air motor for cutting off the supply of air from said compressor to said motor when the power mechanism is operative and for supplying air from said compressor to said motor when the power mechanism is inoperative, said governor means including a valve for controlling the flow of air to said motor and centrifugal force responsive mechanism operatively connected to said air motor for urging said valve toward closed position in response to increases in centrifugal force, said governor means having rotating parts and non-rotating parts and further having means for disconnecting the rotating parts from the non-rotating parts when said power mechanism is operative.

8. In mechanism for driving an accessory for a gas turbine having an engine air compressor and including power means for normally driving power utilization mechanism, auxiliary means for driving the utilization mechanism when the power means are inoperative comprising an air motor for driving said power utilization mechanism, means communicating with said motor for supplying a portion of the compressed air output of said compressor to said motor for driving the same, flow control mechanism operatively interposed between said compressor and said motor for controlling the flow of air from said compressor to said motor and for cutting off the flow of air to said motor, and centrifugal force responsive biasing mechanism operatively connected to said motor for urging said flow control mechanism in a flow-restricting direction in response to increases in motor speed and for urging said flow control mechanism in a flow increasing direction in response to decreases in motor speed, whereby said biasing mechanism actuates said control mechanism to cut off the flow of air from said compressor to said motor when said power means are operative, said centrifugal force responsive biasing mechanism having rotating parts and non-rotating parts further including means to operatively disconnect the rotating parts from the non-rotating parts when the flow of air to said motor is cut off.

9. In a power supply system including power means for normally driving power utilization mechanism, auxiliary means for driving the utilization mechanism when the power means are inoperative comprising means for supplying fluid under pressure, a fluid motor driven by said fluid under pressure, control mechanism operatively interposed between said last-mentioned means and said motor for controlling the flow of fluid to said motor, a balance bellows operatively connected to said control mechanism, means communicating the respective pressures upstream and downstream of said flow control mechanism against the opposite surfaces of said bellows to counteract the pressure force on the flow control mechanism, whereby the operation to said flow control mechanism is substantially independent of changes in fluid pressure, and centrifugal force responsive biasing mechanism operatively connected to said motor for urging said flow control mechanism in a flow restricting direction in response to increases in motor speed and for urging said flow control mechanism in a flow increasing direction in response to decreases in motor speed, whereby said biasing mechanism actuates said control mechanism to cut off the flow of fluid to said motor when said power means are operative, said centrifugal force responsive biasing means having rotatable parts and non-rotatable parts further including means for operatively disconnecting the rotatable parts from the non-rotatable parts when the flow of air to said motor is cut off.

10. In a power supply system including power means for normally driving power utilization mechanism, auxiliary means for driving the utilization mechanism when the power means are inoperative comprising means for supplying fluid under pressure, a fluid motor driven by said fluid under pressure, flow control mechanism operatively interposed between said means for supplying fluid under pressure and said fluid motor for controlling the flow of fluid to said motor and for cutting off the flow of fluid to said motor, spring means for urging said flow control mechanism toward a flow increasing direction, a valve actuator including centrifugal force responsive fly weights operatively connected to said motor for opposing the force exerted by said spring means, and means for urging said flow control mechanism in a flow restricting direction when the force exerted by said spring means is counteracted and for disconnecting said flow control mechanism from said spring means, whereby said valve actuator and said last defined means coact to actuate said flow control mechanism to cut off the flow of fluid to said motor when said power means are operative.

11. In a power supply system including power means for normally driving power utilization mechanism, auxiliary means for driving the utilization mechanism when the power means are inoperative comprising means for supplying fluid under pressure, a fluid motor driven by said fluid under pressure, flow control mechanism operatively interposed between said means for supplying fluid and said fluid motor for controlling the flow of fluid to said motor and for cutting off the flow of fluid to the motor, a balance bellows operatively connected to said flow control mechanism, means communicating the respective pressures upstream and downstream of said flow control mechanism to the opposite surfaces of said bellows to balance the pressure force on the flow control mechanism whereby the operation of the flow control mechanism is substantially unaffected by changes in fluid pressure, spring means connected to said flow control mechanism for urging said flow control mechanism in a flow increasing direction, and a valve actuator mechanism including centrifugal force responsive fly weights operatively connected to said motor for opposing the force exerted by said spring means, said bellows having an inherent spring action for urging said flow control mechanism toward a flow restricting direction when the force exerted by said spring means is counteracted whereby said bellows actuates said flow control mechanism to completely cut off the flow of fluid to said motor when said power means are operative, said centrifugal force responsive biasing means having rotatable parts and non-rotatable parts further including means for disconnecting the rotatable parts from the non-rotatable parts when the flow of air to said motor is cut off.

12. In a fuel supply system for a gas turbine having an engine air compressor and including a fuel pump driven by an electric motor, auxiliary means for driving the fuel pump when the electric motor is inoperative comprising an air motor for driving the fuel pump, means communicating with said compressor and said air motor for supplying a portion of the compressed air output from said compressor to said air motor for driving the same, flow control mechanism operatively interposed between said last-mentioned means and said air motor for controlling the flow of air from said compressor to said air motor and for cutting off the flow of air to said air motor, a balance bellows operatively connected to said flow control mechanism and having an effective pressure area substantially equal to that of the flow control mechanism, means communicating the respective pressures upstream and downstream of said flow control mechanism against the opposite surfaces of said bellows to counteract the pressure force on said flow control mechanism whereby the operation of the flow control mechanism is substantially independent of changes in air pressure, centrifugal force responsive biasing mechanism operatively connected to said air motor for urging said flow control mechanism in a flow restricting direction in response to increases in speed of said air motor and for urging said flow control mechanism in a flow increasing direction in response to decreases in speed of said fluid motor, whereby said biasing mechanism actuates said flow control mechanism to cut off the flow of air from said compressor to said air motor when said electric motor is operative, said centrifugal force responsive biasing mechanism having rotatable parts and non-rotatable parts further including means for disconnecting the rotatable parts from the non-rotatable parts when the flow of air to said flow motor is cut off.

13. In mechanism for driving an accessory for a gas turbine having an engine air compressor and including an electric motor for normally driving the accessory, auxiliary means for driving the accessory when the electric motor is inoperative comprising an air motor for driving the accessory, means communicating with said compressor and said air motor for supplying a portion of the compressed air output of the compressor to said air motor for driving the same, flow control mechanism operatively interposed between said last-mentioned means and said air motor for controlling the flow of air from said compressor to said air motor and for cutting off the flow of air to the air motor, spring means operatively connected with said flow control mechanism for urging said flow control mechanism in a flow increasing direction, actuator mechanism including centrifugal force responsive fly weights operatively connected to said air motor for opposing the force exerted by said spring means to disconnect said spring means from said flow control mechanism, and means for urging said flow control mechanism toward a flow restricting direction when the force exerted by said spring means is counteracted whereby said flow control mechanism is moved to a position to completely cut off the flow of air from said compressor to said air motor when said electric motor is operative.

14. In a fuel supply system for a gas turbine having an engine air compressor and including an electric motor for driving a fuel pump, auxiliary means for driving the fuel pump when the electric motor is inoperative comprising an air turbine connected for driving said pump, means communicating with said compressor and said turbine for supplying a portion of the compressed air supply from said compressor to said turbine for driving the same, a control valve operatively interposed between said compressor and said turbine for controlling the flow of air from said compressor to said turbine for driving the same, a balance bellows operatively connected to said valve and having an effective pressure area substantially equal to that of the valve, means communicating the respective pressures upstream and downstream of said valve against the opposite surfaces of said bellows to counteract the pressure force on the valve whereby the operation of the valve is substantially independent of changes in air pressure, a spring operatively connected to said valve for urging said valve toward open position, a valve actuator including centrifugal force responsive fly weights operatively connected to said turbine for opposing the force exerted by said spring whereby the fly weights urge the valve actuator to a position to disassociate the spring from the valve and any rotating parts from any non-rotating parts when the spring force is effectively counteracted, said bellows having an inherent spring action for urging said valve toward closed position when the force exerted by said spring is counteracted whereby said valve is moved to completely closed position to cut off the flow of air from said engine compressor to said turbine when said electric motor is operative.

15. In a power supply system including a turbine having a turbine wheel with turbine vanes formed about its periphery and including means for supplying fluid under pressure against said vanes for driving the turbine, a valve operatively interposed between said means for supplying fluid and said turbine for controlling the flow of fluid to said turbine, said turbine wheel having radial slots formed in one face inwardly of said vanes, fly weights radially movably disposed in said slots, and actuator mechanism having a portion operatively connected to said fly weights and a portion operatively connected to said valve, said actuator mechanism being arranged to move said valve toward open position in response to radially inward movement of said fly weights when the speed of said turbine falls below a predetermined value and being arranged to move said valve toward closed position in response to radially outward movement of said fly weights when the speed of said turbine increases above a predetermined higher value, said actuator mechanism further including means operatively disconnecting said valve from said flyweights when said valve is closed.

16. In a power supply system having housing, a shaft within said housing, an electric motor for normally driving said shaft, auxiliary means for driving said shaft when the electric motor is inoperative comprising an inlet and an outlet in said housing for receiving and discharging fluid under pressure, a fluid motor in said housing within the flow path of said fluid under pressure, a control valve located within the flow path of said fluid under pressure for controlling the flow of fluid to said motor, said control valve being disposed coaxially about said shaft and radially inwardly of said fluid motor, and centrifugal force responsive biasing mechanism coaxially disposed about said shaft and radially inwardly of said fluid motor for urging said control valve towards closed position in response to increases in motor speed and for urging said control valve towards open position in response to decreases in motor speed.

17. The system as claimed in claim 16 wherein said centrifugal force biasing mechanism further includes a balance bellows connected to said valve and means communicating the respective pressures upstream and downstream of said valve across the opposite surfaces of said valve to counteract the pressure forces on said valve so that said bellows and valve are independent of the upstream and downstream pressures.

18. The system as claimed in claim 16 wherein centrifugal force responsive biasing mechanism includes fly weights and frustro-conical surfaces, said weights cooperating with frusto-conical surfaces, said surfaces further being located radially inward of said fluid motor.

References Cited in the file of this patent
UNITED STATES PATENTS

| | | |
|---|---|---|
| 1,017,571 | Loewenstein | Feb. 13, 1912 |
| 1,554,093 | Hosel | Sept. 15, 1925 |
| 1,759,763 | Standerwick | May 20, 1930 |
| 1,774,997 | Schmidt | Sept. 2, 1930 |
| 1,795,447 | Schmid | Mar. 10, 1931 |
| 1,841,425 | Taylor | Jan. 19, 1932 |
| 1,864,217 | Rathbun | June 21, 1932 |
| 1,888,078 | Grube et al. | Nov. 15, 1932 |
| 2,331,503 | Ray | Oct. 12, 1943 |
| 2,402,972 | Mitchell | July 2, 1946 |
| 2,466,358 | Besserdich et al. | Apr. 5, 1949 |
| 2,553,584 | Hirsch et al. | May 22, 1951 |